United States Patent
Park et al.

(10) Patent No.: US 9,882,378 B2
(45) Date of Patent: Jan. 30, 2018

(54) ELECTRONIC APPARATUS AND DRIVING CONTROL METHOD THEREOF

(75) Inventors: Jeong-gyu Park, Yongin-si (KR); Yeong-bok Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 554 days.

(21) Appl. No.: 13/613,402

(22) Filed: Sep. 13, 2012

(65) Prior Publication Data

US 2013/0205140 A1    Aug. 8, 2013

(30) Foreign Application Priority Data

Feb. 6, 2012   (KR) .................. 10-2012-0012054

(51) Int. Cl.
*H02J 1/10*   (2006.01)
*H02J 7/00*   (2006.01)

(52) U.S. Cl.
CPC .............. *H02J 1/10* (2013.01); *H02J 7/0068* (2013.01)

(58) Field of Classification Search
CPC .................................................. H01M 2/1022
See application file for complete search history.

(56) References Cited

U.S. PATENT DOCUMENTS

| | | | |
|---|---|---|---|
| 5,144,218 A * | 9/1992 | Bosscha | 320/139 |
| 5,918,060 A | 6/1999 | Jeong | |
| 5,944,829 A * | 8/1999 | Shimoda | 713/324 |
| 6,329,796 B1 * | 12/2001 | Popescu | H02J 1/10 320/134 |
| 6,470,290 B1 | 10/2002 | Lee et al. | |
| 6,928,568 B2 | 8/2005 | Breen et al. | |
| 8,350,408 B2 | 1/2013 | Miyanaga et al. | |
| 8,683,235 B2 | 3/2014 | Yokoyama | |
| 8,816,539 B2 | 8/2014 | Hermerding, II et al. | |
| 8,862,907 B2 | 10/2014 | Furusho et al. | |
| 2004/0145348 A1 | 7/2004 | Bucur et al. | |
| 2004/0230853 A1 | 11/2004 | Miyamoto | |
| 2007/0250722 A1 * | 10/2007 | Montero et al. | 713/300 |
| 2008/0005592 A1 * | 1/2008 | Allarey et al. | 713/300 |

(Continued)

FOREIGN PATENT DOCUMENTS

| | | |
|---|---|---|
| CN | 1051793 | 5/1991 |
| CN | 101884153 | 11/2010 |

(Continued)

OTHER PUBLICATIONS

Extended European Search Report dated Jul. 28, 2016 in corresponding European Application No. 12 18 9210.3.

(Continued)

*Primary Examiner* — Paul J Yen
(74) *Attorney, Agent, or Firm* — Staas & Halsey LLP

(57) ABSTRACT

An electronic apparatus includes an input unit to receive an input of DC power from an external adaptor, a battery unit to store the received DC power, a first control unit to drive the electronic apparatus using power of the battery unit or power received from the input unit in a first operation mode, and to drive the electronic apparatus using both the power of the battery unit and the power input from the input unit in a second operation mode, and a power control unit to prevent a mode of the electronic apparatus from being changed to the second operation mode according to a state of the battery unit.

14 Claims, 8 Drawing Sheets

(56) References Cited

U.S. PATENT DOCUMENTS

| | | | |
|---|---|---|---|
| 2008/0074080 A1* | 3/2008 | Luo | G06F 1/263 320/132 |
| 2009/0292487 A1* | 11/2009 | Duncan et al. | 702/63 |
| 2010/0270862 A1 | 10/2010 | Miyanaga et al. | |
| 2010/0327813 A1 | 12/2010 | Bucur et al. | |
| 2011/0001484 A1* | 1/2011 | Stits et al. | 324/426 |
| 2011/0234151 A1 | 9/2011 | Uan-Zo-li et al. | |
| 2011/0252247 A1* | 10/2011 | Yokoyama | 713/300 |
| 2011/0307732 A1 | 12/2011 | Furusho et al. | |
| 2012/0001489 A1 | 1/2012 | Hermerding, II et al. | |
| 2012/0030487 A1 | 2/2012 | Takinami | |
| 2014/0159484 A1 | 6/2014 | Yokoyama | |

FOREIGN PATENT DOCUMENTS

| | | |
|---|---|---|
| DE | 10 2010 042 030 | 10/2011 |
| EP | 0 425 044 | 5/1991 |
| JP | 4-165515 | 6/1992 |
| JP | 10-3333 | 1/1998 |
| JP | 10-268986 | 10/1998 |
| JP | 2002-91629 | 3/2002 |
| JP | 2004-248487 | 9/2004 |
| JP | 2004-341755 | 12/2004 |
| JP | 2007-226617 | 9/2007 |
| JP | 2011-211894 | 10/2011 |
| JP | 2011-259625 | 12/2011 |
| JP | 2012-033044 | 2/2012 |
| JP | 2013-529346 | 7/2013 |

OTHER PUBLICATIONS

Chinese Office Action dated May 31, 2016 in corresponding Chinese Application No. 201210441558.4.
Chinese Office Action dated Jan. 16, 2017 in corresponding Chinese Patent Application No. 201210441558.4.
Japanese Office Action dated Dec. 20, 2016 in corresponding Japanese Patent Application No. 2013-021361.
Japanese Notice of Allowance dated Oct. 3, 2017 in corresponding Japanese Patent Application No. 2013-021361.

* cited by examiner

FIG. 4

| Presence/Absence of Adaptor | Battery | | | CPU (except for QC) -Turbo Boost Function- | EGFX | Remark |
|---|---|---|---|---|---|---|
| | Above 3% | Below 3% | Nil | | | |
| ○ | | | ○ | PL2(TDPx1.25) → PL1(TDP)<br><br>-Limited Use of PECI by T.Boost | Performance Engine → 75%<br>Performance is limited to pre-defined performance if adaptor power exceeds 60W:75% | Pop-up realized or N.A |
| ○ | | ○ | | PL2(TDPx1.25) → PL1(TDP)<br><br>-Limited Use of PECI by T.Boost | Performance Engine → 75%<br>Performance is limited to pre-defined performance if adaptor power exceeds 60W:75% | Pop-up realized or N.A |
| ○ | ○ | | | Normal Operation<br>PL2 (TDPx1.25) Setting | Normal Operation<br>Performance Engine → 100% | 60W |
| × | | | | Not Changed: Battery Mode | Not Changed: Battery Mode | Not Changed |

ELECTRONIC APPARATUS AND DRIVING CONTROL METHOD THEREOF

CROSS-REFERENCE TO RELATED APPLICATIONS

This application claims priority under 35 U.S.C. § 119 from Korean Patent Application No. 10-2012-0012054, filed on Feb. 6, 2012 in the Korean Intellectual Property Office, the disclosure of which is incorporated herein by reference in its entirety.

BACKGROUND OF THE INVENTION

1. Field of the Invention

Methods and apparatuses consistent with exemplary embodiments relate to an electronic apparatus and a driving control method thereof, and more particularly, to an electronic apparatus which can supply power stably according to a state of a battery unit and a load condition, and a driving control method thereof.

2. Description of the Related Art

A recent notebook computer introduces a hybrid power system to simultaneously supply power of both a battery and an adaptor to a system if a system load instantaneously increases.

However, if the battery is not mounted in the notebook computer or the mounted battery has a very low charge capacity in the hybrid power system, a high load is exerted to the adaptor and thus may damage the adaptor.

Specifically, since a notebook computer having the hybrid power system has late latency for power input from an adaptor, the adaptor increases up to an over current protection (OCP) level and thus an adaptor voltage decreases. Therefore, there are problems in that the system may be shut-down abnormally and thus may lose data or exceed rated power of the adaptor. These problems will be explained below with reference to FIG. 8.

FIG. 8 is a view illustrating a waveform to explain problems of a related-art hybrid power system.

Referring to FIG. 8, when a notebook computer enters a hybrid power system (that is, a turbo mode) to use power of an adaptor and a power source of a battery simultaneously, a current flowing from the adaptor to the notebook computer increases abruptly and instantaneously.

SUMMARY OF THE INVENTION

The present general inventive concept provides an electronic apparatus which can supply power stably according to a state of a battery unit and a load condition, and a driving control method thereof.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing an electronic apparatus having a plurality of operation modes, the electronic apparatus including an input unit to receive an input of DC power from an external adaptor, a battery unit to store the received DC power, a first control unit to drive the electronic apparatus using power of the battery unit or power received from the input unit in a first operation mode, and to drive the electronic apparatus using both the power of the battery unit and the power input from the input unit in a second operation mode, and a power control unit to prevent a mode of the electronic apparatus from being changed to the second operation mode according to a state of the battery unit.

The power control unit may detect a charge state of the battery unit, and, when the detected charge state is less than or equal to a predetermined capacity, may prevent a mode of the electronic apparatus from being changed to the second operation mode.

The battery unit may be removable from the electronic apparatus, and the power control unit may detect whether the battery unit is mounted or not, and, when the battery unit is not mounted in the electronic apparatus, may prevent a mode of the electronic apparatus from being changed to the second operation mode.

The power control unit may control to provide the power input through the input unit to the first control unit selectively according to an operation mode of the electronic apparatus, and may control the battery unit to be charged with the power input through the input unit according to an operation mode of the electronic apparatus and a charge state of the battery unit.

The electronic apparatus may further include a comparison circuit unit which detects a current of the power input through the input unit, and, if the detected current is greater than or equal to a predetermined current, controls the first control unit to be operated in a third operation mode in which power lower than power of the first operation mode is consumed.

The comparison circuit unit may include a first voltage generation unit to generate a voltage value corresponding to a current value of the power input through the input unit, a second voltage generation unit to generate a predetermined reference voltage value corresponding to the predetermined current, and a comparison unit to compare an output voltage of the first voltage generation unit and an output voltage of the second voltage generation unit, and to provide a result of the comparing to the first control unit.

The power control unit may obtain information on rated power of the adaptor and may control the second voltage generation unit to generate a predetermined reference voltage value corresponding to the obtained information.

The electronic apparatus may further include a user interface unit to display information indicating that the electronic apparatus is operated in a third operation mode when a mode of the electronic apparatus is changed to the third operation mode.

The electronic apparatus may further include a user interface unit to display an alert message when a mode of the electronic apparatus is changed to the second operation mode and the second operation mode is maintained longer than for a predetermined time.

The first control unit may be at least one of a central processing unit (CPU), a graphic processing unit, and a CPU having a graphic processing unit embedded therein.

The electronic apparatus may further include a second control unit which provides information on a state of the battery unit and a state of the input unit to the first control unit.

The second control unit may be a main board chipset.

The first operation mode may be a mode in which the first control unit is operated by predetermined first thermal design power, and the second operation mode may be a mode in which the first control unit is operated by second thermal design power that is higher than the first thermal design power, using both power of the battery unit and power input from the input unit.

The foregoing and/or other features and utilities of the present general inventive concept may also be achieved by providing a driving control method of an electronic apparatus which has a plurality of operation modes, the method including driving in a first operation mode in which a control unit is operated according to a predetermined first thermal design power, and changing a mode of the electronic apparatus to a second operation mode, in which the control unit is operated according to a second thermal design power higher than the first thermal design power, using both DC power provided from an external adaptor and power of a battery unit according to an operation load of the electronic apparatus. The changing may include preventing a mode of the electronic apparatus from being changed to the second operation mode according to a state of the battery unit.

The changing may include detecting a charge state of the battery unit, and, when the detected charge state is less than or equal to a predetermined capacity, preventing a mode of the electronic apparatus from being changed to the second operation mode.

The battery unit may be removable from the electronic apparatus, and the changing may include detecting whether the battery unit is mounted or not, and, when the battery unit is not mounted in the electronic apparatus, preventing a mode of the electronic apparatus from being changed to the second operation mode.

The method may further include detecting a current of power input through an input unit, and, when the detected current is greater than or equal to a predetermined current, changing a mode to a third operation mode in which the control unit consumes power lower than power of the first operation mode.

The method may further include obtaining information of rated power of the adaptor, and the predetermined current may be a current value corresponding to the obtained information.

The method may further include, when a mode of the electronic apparatus is changed to the third operation mode, displaying information indicating that the electronic apparatus is operated in the third operation mode.

The control unit may be at least one of a central processing unit (CPU), a graphic processing unit, and a CPU having a graphic processing unit embedded therein.

The foregoing and/or other features and utilities of the present general inventive concept may also be achieved by providing a non-transitory computer-readable medium to contain computer-readable codes as program to execute a driving control method of an electronic apparatus which has a plurality of operation modes, the method including driving in a first operation mode in which a control unit is operated according to a predetermined first thermal design power, and changing a mode of the electronic apparatus to a second operation mode, in which the control unit is operated according to a second thermal design power higher than the first thermal design power, using both DC power provided from an external adaptor and power of a battery unit according to an operation load of the electronic apparatus. The changing may include preventing a mode of the electronic apparatus from being changed to the second operation mode according to a state of the battery unit.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 4 is a view illustrating an example of an operation mode of an electronic apparatus according to an exemplary embodiment of the present general inventive concept;

DETAILED DESCRIPTION OF THE PREFERRED EMBODIMENTS

Figure 1:
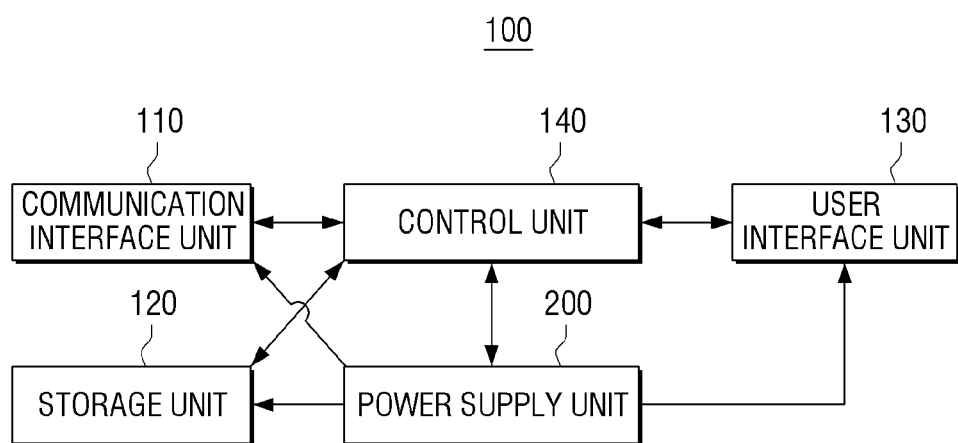
FIG. 1 is a block diagram illustrating an electronic apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating an electronic apparatus 100 according to an exemplary embodiment of the present general inventive concept.

Referring to FIG. 1, the electronic apparatus 100 according to an exemplary embodiment includes a communication interface unit 110, a storage unit 120, a user interface unit 130, a control unit 140, and a power supply unit 200. The electronic apparatus 100 may be a notebook computer or a tablet to which a hybrid power system is applicable.

The electronic apparatus 100 has a plurality of operation modes. The plurality of operation modes may include a first operation mode (or a normal mode) in which the electronic apparatus 100 is operated by predetermined first thermal design power and a second operation mode (or a turbo mode) in which the electronic apparatus 100 is operated by second thermal design power which is higher than the first thermal design power. The second thermal design power may be higher than the first thermal design power. When the electronic apparatus 100 is operated by the second thermal design power in the second operation mode, the electronic apparatus 100 may be supplied with power from a hybrid power system, which uses power from an adaptor and power of a battery simultaneously.

The communication interface unit 110 is adapted to connect the electronic apparatus 100 to an external apparatus and may access the external apparatus through a local area network (LAN) and the Internet and also may access the external apparatus through a wireless communication network (for example, GSM, UMTS, LTE, WiBRO, etc.).

The storage unit 120 stores a program to drive the electronic apparatus 100. The storage unit 120 may store a program which is a collection of various commands necessary to drive the electronic apparatus 100 to perform a function thereof. The program recited herein includes an application to provide a specific service, and an operating program to drive an application thereof. The storage unit 120 may be realized by an internal storage medium of the electronic apparatus 100 or an external storage medium connectable to the electronic apparatus 100, for example, a removable disk including an USB memory or a web server connected to a network.

The user interface unit 130 includes a plurality of function keys through which a user sets or selects various functions supported by the electronic apparatus 100, and may display a variety of information provided by the electronic apparatus 100. The user interface unit 130 may be realized by an apparatus that performs input and output simultaneously such as a touch pad, or by an apparatus that combines a mouse and a monitor.

The user interface unit 130 may display information on a current operation mode of the electronic apparatus 100. When a mode of the electronic apparatus 100 is changed in an operation mode, for example, between the first operation mode and the second operation mode or when a mode of the electronic apparatus 100 is changed to a third operation mode, the user interface unit 130 may display information indicating that the mode of the electronic apparatus 100 is changed between the first operation mode and the second operation mode or to the third operation mode. When a mode of the electronic apparatus 100 is changed to the second operation mode, the user interface unit 130 may display information indicating that the mode of the electronic apparatus 100 is changed to the second operation mode and an operating time in the second operation mode. The third operation mode recited herein refers to an operation mode in which the electronic apparatus 100 consumes power lower than the power in the first operation mode. The third operation mode may be a power saving mode to control the electronic apparatus 100 to reduce a power consumption.

The user interface unit 130 may display information on a power state. The user interface unit 130 may display information on a power state of an adaptor, such as information regarding whether an adaptor is connected or not, information regarding a mounting state of a battery, that is, whether a battery unit is mounted or not, and information on a charge state of the battery unit, that is, whether the battery unit is charged fully or partially.

Figure 3:
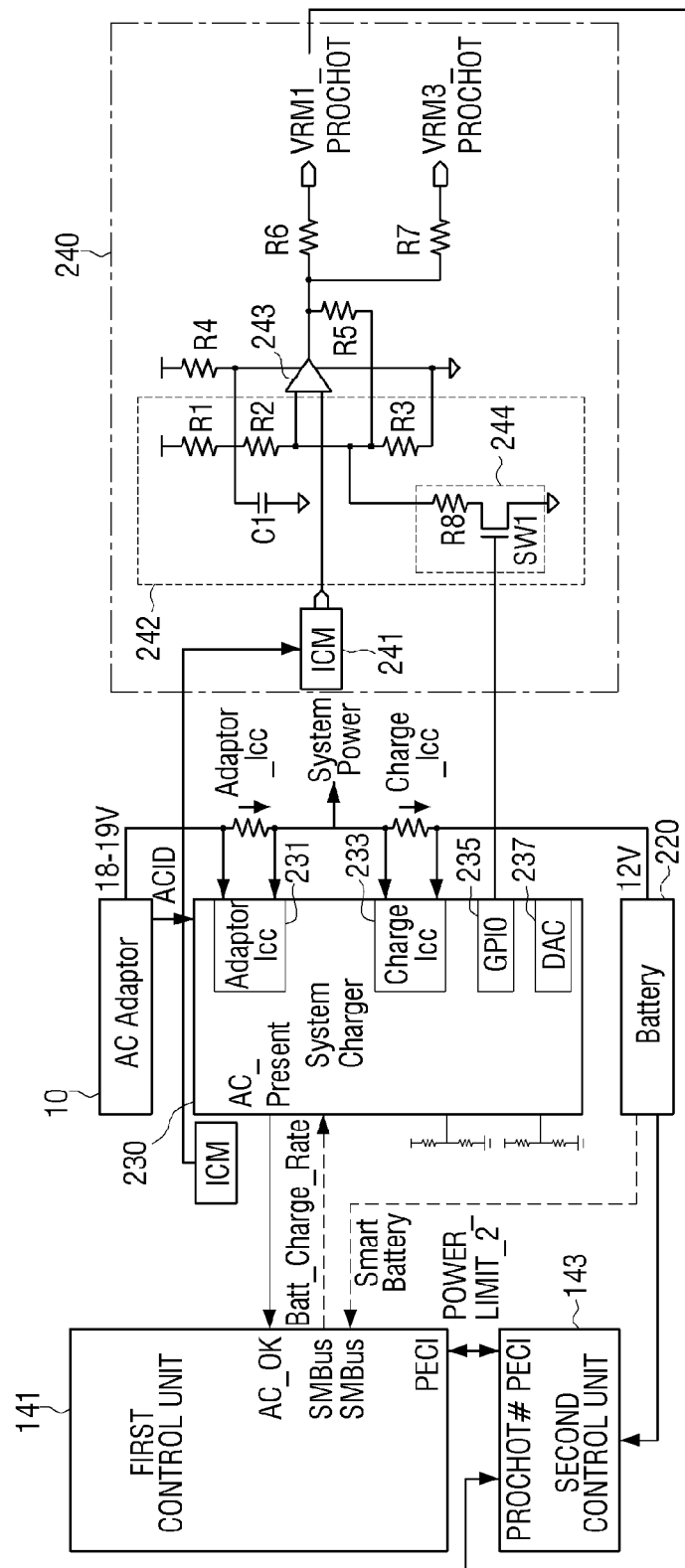
FIG. 3 is a circuit diagram illustrating an electronic apparatus according to an exemplary embodiment of the present general inventive concept.

The control unit 140 controls the elements of the electronic apparatus 100. The control unit 140 may include a first control unit 141 and a second control unit 143 as illustrated in FIG. 3. The first control unit 141 may be a central process unit (CPU), a graphic processing unit, or a CPU having a graphic processing unit embedded therein, and the second control unit 143 may be a main board chipset. Detailed configuration and operation of the first control unit 141 and the second control unit 143 will be explained below with reference to FIG. 3.

The electronic apparatus 100 may include a functional unit to perform a function of the electronic apparatus 100. The function of the functional unit may include, but not limited to, processing data (or audio, video, or communication data), displaying an image according to the processed data, photographing an object to generate data, generating image data corresponding to the generated data, and/or communicating with an external device to transmit or receive data corresponding to the function of the electronic apparatus 100. The functional unit may be connected to the control unit 140 in a housing of the electronic apparatus 100. It is also possible that the functional unit may be included in the control unit 140 such that the control unit 140 can perform the function of the functional unit and its own function. For example, the control unit 140 having the functional unit may include the first control unit 141 and/or the second control unit 143. The functional unit may include electrical and/or mechanical components to perform the function thereof.

The power supply unit 200 supplies power to the elements included in the electronic apparatus 100. Detailed configuration and operation of the power supply unit 200 will be explained below with reference to FIG. 2.

Figure 2:
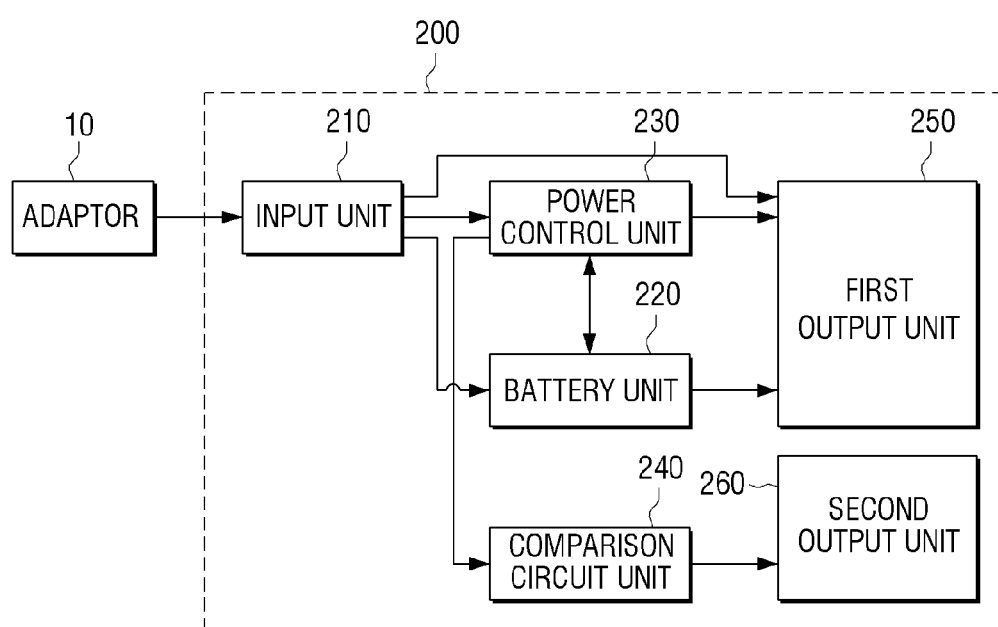
FIG. 2 is a block diagram illustrating a power supply unit of FIG. 1 in detail.

FIG. 2 is a block diagram illustrating the power supply unit of FIG. 1 according to an embodiment of the present general inventive concept.

Referring to FIG. 2, the power supply unit 200 includes an input unit 210, a battery unit 220, a power control unit 230, a comparison circuit unit 240, a first output unit 250, and a second output unit 260.

The input unit 210 receives direct current (DC) power from an external adaptor 10.

The battery unit 220 stores the received DC power in a primary cell. The battery unit 220 may include a secondary cell to be charged with the received DC power. The secondary cell may be a nickel cell, a cadmium cell, or a nickel-cadmium cell. The battery unit 220 supplies power of at least one of the primary cell and the secondary cell to each of the elements of the electronic apparatus 100.

The power control unit 230 charges the battery unit 220 with power input through the input unit 210 according to an operation mode of the electronic apparatus and a charge state of the battery unit. When the electronic apparatus 100 is operated in the first operation mode (that is, if the electronic apparatus 100 is operated in an operation mode other than the second operation mode) and receives DC power through the input unit 210, the power control unit 230 may charge the battery unit 220 using the DC power input through the input unit 210.

If the electronic apparatus 100 is operated in the second operation mode or if the battery unit 220 is fully charged (a full charge state), the power control unit 230 does not charge the battery unit 220 even if DC power is input through the input unit 210.

The power control unit 230 selectively provides power input through the input unit 210 to the first control unit 141 according to an operation mode of the electronic apparatus 100. When the electronic apparatus 100 is operated in the second operation mode, the power control unit 230 may control to provide both the power input through the input unit 210 and the power of the battery unit 220 to the first control unit 141. That is, if the electronic apparatus 100 is to be operated or to be set in the second operation mode, the power control unit 230 controls the elements of the power supply unit 200 to supply power to the first control unit 141 using a hybrid power system.

The power control unit 230 prevents a mode of the electronic apparatus 100 from being changed to the second operation mode according to a state of the battery unit 220. The electronic apparatus 100 may have an electrical or mechanical terminal or an unit (not illustrated) to detect the state of the battery unit 220. The power control unit 230 detects a charge state (charging level) and/or a mounting state of the battery unit 220, and, if the detected charge state or charging level is lower than or equal to a predetermined capacity or if the battery unit 220 is not mounted in the electronic apparatus 100, the power control unit 230 prevents a mode of the electronic apparatus 100 from being changed to the second operation mode. In the present exemplary embodiment, the power control unit 230 prevents the mode of the electronic apparatus 100 from being changed to the second operation mode. However, the present general inventive concept is not limited thereto. This function may be performed by the first control unit 141 or the second control unit 143 of the control unit 140.

The power control unit 230 may receive ID information of the connected adaptor 10 through the input unit 210. The adaptor 10 may store the ID information and provide the ID information to the electronic apparatus 100 when requested by or installed in the electronic apparatus 100. The power control unit 230 may control the comparison circuit unit 240 to generate a reference voltage corresponding to the obtained ID information. The power control unit 230 may receive a signal corresponding to the operation modes, for example, the control unit 140, to control related components and units to operate the electronic apparatus 100 in the corresponding operation modes.

If the power input through the input unit 210 is greater than or equal to a predetermined current value, the comparison circuit unit 240 provides corresponding information to the control unit 140 so that the electronic apparatus 100 is operated in the third operation mode. The comparison circuit unit 240 detects a current of the power input through the input unit 210, and, if the detected current is greater than or equal to a predetermined current, the comparison circuit unit 240 controls the first control unit 141 to be operated in the third operation mode. The third operation mode is a mode in which the electronic apparatus 100 consumes power lower than that in the first operation mode. Detailed configuration and operation of the comparison circuit unit 240 will be explained below with reference to FIG. 3.

The first output unit 250 supplies power to each of the elements of the electronic apparatus 100. When the electronic apparatus 100 is operated in the first operation mode, the first output unit 250 selectively supplies the power input through the input unit 210 or the power of the battery unit 220 to each of the elements of the electronic apparatus 100. If the electronic apparatus 100 is operated in the second operation mode, the first output unit 250 may provide both the power input through the input unit 210 and the power of the battery unit 220 to the control unit 140. In the present exemplary embodiment, the power is supplied to each of the elements of the electronic apparatus 100 through at least one of the first output unit 250 and the second output unit 260. However, the present general inventive concept is not limited thereto. The power may be supplied to each of the elements of the electronic apparatus 100 through a plurality of output units.

The second output unit 260 provides information on a state of the battery unit 220 and a state of the input unit 210 to the control unit 140.

If the current input through the input unit 210 is greater than or equal to the predetermined current value, the second output unit 260 provides information indicating that the mode should be changed to the third operation mode to the control unit 140, specifically, to the first control unit 141. In the present exemplary embodiment, a variety of information is provided to the control unit 140 through the second output unit 260. However, the present general inventive concept is not limited thereto. A variety of information and/or the above-described information may be directly provided from the input unit 210 or the power control unit 230 to the control unit 140 without using the first output unit 250 and/or the second output unit 260.

The first output unit 250 and the second output unit 260 may be connected to the control unit 140 and corresponding components and units of the electronic apparatus 100 to transmit or receive power and/or data and signal relating to the information and command to perform corresponding functions thereof.

FIG. 3 is a circuit diagram illustrating an electronic apparatus 100 according to an exemplary embodiment of the present general inventive concept.

Referring to FIG. 3, the electronic apparatus 100 may include a battery unit 220, a power control unit 230, a comparison circuit unit 240, a first control unit 141, and a second control unit 143.

The first control unit 141 may be a central processing unit (CPU), a graphic processing unit, or a CPU having a graphic processing unit embedded therein.

The first control unit 141 may determine an operation mode of the electronic apparatus 100. The first control unit 141 may usually control the electronic apparatus 100 to be operated in a first operation mode, and, if a high load is necessary, may selectively control the electronic apparatus 100 to be operated in a second operation mode. If a load needs to be reduced or if a user sets the electronic apparatus 100 to be in a power saving mode, the first control unit 141 may selectively control the electronic apparatus 100 to be operated in a third operation mode.

The first control unit 141 may determine whether to change a mode to the second operation mode or whether to not change a mode to the second mode, based on a state of the battery unit 220 and/or a state of the input unit 210. As described above, in the second operation mode, the electronic apparatus 100 is supplied with power from a hybrid power system, which simultaneously uses both the power of the adaptor and the power of the battery. When the battery unit 220 is not mounted in the electronic apparatus 100 or when a charge capacity of the battery unit 220 is less than or equal to a predetermined value, the adaptor 10 may exceed rated power. Therefore, when the battery unit 220 is mounted in the electronic apparatus 100, the charge capacity of the battery unit 220 is greater than a predetermined capacity, and a power, for example, DC power is supplied through the input unit 210, the first control unit 141 may control to change the mode of the electronic apparatus 100 from the first operation mode to the second operation mode. A detailed operation state of the first control unit 141 according to the state of the battery unit 220 and the input unit 210 is illustrated in FIG. 4.

Even if a high load is necessary, the first control unit 141 may prevent a mode of the electronic apparatus 100 from being changed to the second operation mode when the battery unit 220 is not mounted in the electronic apparatus 100, a charge capacity of the battery unit 220 is less than or equal to a predetermined capacity even if the battery unit 220 is mounted, or if a DC power is not supplied through the input unit 210.

When a high load is not necessary any more or when the second operation mode is maintained for a period of time equal to or longer than a predetermined time, the first control unit 141 may control an operation mode of the electronic apparatus 100 to be changed from the second operation mode to the first operation mode.

When information indicating that it is necessary to change a mode to the third operation mode is input from the control unit 140 or the power supply unit 200, for example, the comparison circuit unit 240, the first control unit 141 may control an operation mode of the electronic apparatus 100 to be changed to the third operation mode. The third operation mode is an operation mode in which the first control unit 141 is operated at a predetermined performance level, for example, approximately 75% of the performance in comparison with the performance of the first control unit 141 in the first operation mode.

The second control unit 143 may receive information on the state of the battery unit 220 and the state of the input unit 210 from the power control unit 230, and may provide the information on the state of the battery unit 220 and the state of the input unit 210 to the first control unit 141. The second control unit 143 may be a main board chipset.

The first control unit 141 and the second control unit 143 may be formed as a semiconductor package including a plurality of semiconductor chips disposed therein. Here, the second control unit 143 may be in the main board chipset of the semiconductor package, and the first control unit 141 may be in at least one of the semiconductor chips of the semiconductor package. It is possible that the first control unit 141 and the second control unit 143 can be disposed in boards electrically connected thereto. The first control unit 141 and the second control unit 143 may communicate with each other through communication ports PECI.

The power control unit 230 may include an adaptor current detection unit 231, a charge current detection unit 233, a comparison circuit control unit 235, and an adaptor control unit 237.

Here, the input unit 210 may be disposed between the adaptor 10 and the power control unit 230 as illustrated in FIG. 2. Although not illustrated in FIG. 3, the input unit 210 may include one or more resistors usable to generate current or voltage for the adaptor current detection unit 231 and the charge current detection unit 233, for example, or one or more signal lines to transmit data or signal, for example, information ACID.

A system power output from the input unit 210 and/or adaptor 10 may be used in components and units of the electronic apparatus 100. It is possible that the system power may be supplied to corresponding components or units of the electronic apparatus 100 regardless of the determined mode. When the system power is not generated due to a state of the input unit 210 or a state of the adaptor 10, a power of the battery may be used in place of the system power.

The adaptor current detection unit 231 may detect a level of a current Adaptor Icc of power input through the input unit 210. The adaptor current detection unit 231 may detect a value of a current Adaptor Icc of power input through the input unit 210 using an external resistance. The detected current value may be provided to the second control unit 143 from the adaptor current detection unit 231 of the power control unit 230. In the present exemplary embodiment, the detected current value is provided to the second control unit 143. However, it is possible that the adaptor current detection unit 231 of the power control unit 230 provides the second control unit 143 with information indicating whether the detected current value falls within a predetermined range or not rather than the detected current value.

The charge current detection unit 233 may detect a level of a current Charge Icc supplied to the battery unit 220. The charge current detection unit 233 may detect a charge current value of power supplied to the battery unit 220 using an external resistance. The detected charge current value may be provided to the second control unit 143. In the present exemplary embodiment, the detected charge current value is provided to the second control unit 143. However, it is possible that the change current detection unit 233 provides the second control unit 143 with information indicating whether the detected charge current value falls within a predetermined range or not rather than the detected charge current value.

The comparison circuit control unit 235 determines rated power of the adaptor 10 based on ID information ACID received from the adaptor 10, calculates a rated current corresponding to the rated power, and controls a second voltage generation unit 242 of the comparison circuit unit 240 to generate a reference voltage corresponding to the calculated rated current. The reference voltage is transmitted through a port GPIO to the comparison circuit unit 240. In the present exemplary embodiment, the ID information ACID is received from the adaptor 10 and the reference voltage is adjusted using the ID information ACID. However, information on rated power or a rated current may be directly received from the adaptor 10, and the reference voltage may be adjusted based on the current detected by the adaptor current detection unit 231.

The adaptor control unit 237 provides information for limiting an input current of the adaptor 10 to the adaptor 10. The adaptor control unit 237 may limit the input current of the adaptor 10 using a dedicated administrator connection (DAC) port.

The power control unit 230 may communicate with the first control unit 141 to transmit a signal representing power AC of the adaptor 10 to a port AC_OK of the first control unit 141 such that signal can be usable to determine the corresponding mode. That is, the signal indicates that the adaptor 10 is connected to an external power source to receive the power AC. The power control unit 230 may receive a signal or information corresponding to a battery charge rate from the first control unit 141 through a line SMBus to control charging of the battery 220.

If the input current of the adaptor 10 is greater than or equal to a predetermined current value, the comparison circuit unit 240 may directly provide corresponding information to the first control unit 141 in a hardware level such that the information can be used in determination of a mode in the first control unit 141.

The comparison circuit unit 240 may include a first voltage generation unit 241, the second voltage generation unit 242, and a comparison unit 243.

The first voltage generation unit 241 generates a voltage value corresponding to a current value of power input through the input unit 210. The first voltage generation unit 241 may generate a voltage value corresponding to the current level detected by the adaptor current detection unit 231. In the present exemplary embodiment, it is possible that the current level detected by the adaptor current detection unit 231 can be used. However, a voltage value of a resistance connected to the adaptor current detection unit 231 may be directly used in the first voltage generation unit 241. The voltage value is transmitted from the power control unit 230 through a port ICM to the first voltage generation unit 241. It is also possible that the voltage value can be transmitted from the adaptor 10 or the input unit 210 to the first voltage generation unit 241.

The second voltage generation unit 242 may include resistors R1-R5 and a capacitor C1. The second voltage generation unit 242 receives the voltage value of the first voltage generation unit 241 and also receives the reference voltage from the comparison circuit control unit 235 of the power control unit 230. The predetermined reference voltage may correspond to a predetermined current. The second voltage generation unit 242 may generate the voltage value corresponding to the rated power of the adaptor 10. In the present exemplary embodiment, the voltage value may be changed using a switching unit 244 having a separate switching element SW1 and a separate resistor R8 provided on a line connection to a plurality of resistors R1, R2, and R3 connected in series thereof. However, a variable resistance may be used and the voltage value may be changed using a plurality of switching elements and a plurality of resistors (not illustrated) according to a user or design preference.

The comparison unit 243 compares the output voltage generated from the first voltage generation unit 241 and the output voltage generated from the second voltage generation unit 242 through the second voltage generation unit 242, and provides a result of the comparing to the first control unit 141 using resistors R 6 and R7. The comparing result of the comparison unit 243 is output through ports VRM1_PROCHT and VRM3_PROCHOT through resistors R6 and R7, respectively. When the output voltage of the first voltage generation unit 241 is greater than the output voltage of the second voltage generation unit 242, the comparison unit 243 determines that power greater than the rated power of the adaptor 10 is output and provides corresponding information (PROCHOT#) to the first control unit 141 through a port VRM1_PROCHOT. The comparison result may also be output through the port VRM3_PROCHOT to be usable in the electronic apparatus 100 to control the power consumption and the mode control.

The battery unit 220 may output information Smart Battery and/or a voltage to the SMBus of the first control unit 141. The information Smart Batter may include information on voltage storing cells, capacitance, and output voltages, and the voltage may be output to the first control unit 141 or a corresponding unit of the electronic apparatus 100 to perform a function thereof.

The first control unit 141 may output a signal POWER LIMIT_2 according to signals received from the power control unit 230 and/or the battery unit 220 and may communicate with the second control unit 143 such that the corresponding unit can be controlled and the corresponding mode is determined.

In the present exemplary embodiment, a separate comparison circuit unit realized by hardware is provided and limits a load of the system rapidly in response to a load of the system which suddenly changes within a short period of time, for example, 1 mS. Such an effect of the present disclosure will be explained below with reference to FIGS. 5A and 5B.

Figure 5A:
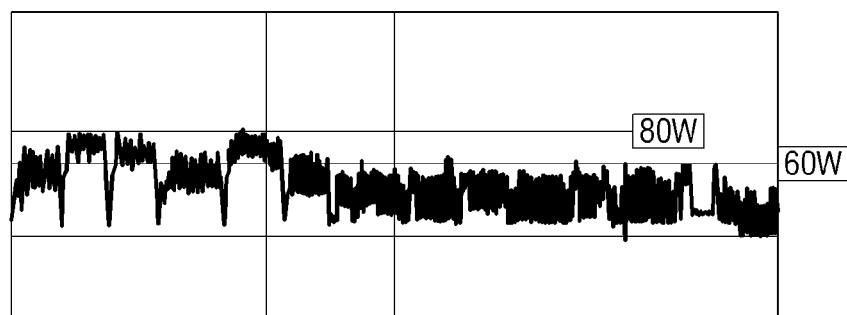
FIGS. 5A and 5B are views illustrating a waveform of an output voltage of a related art electronic apparatus and a waveform of an output voltage of an electronic apparatus according to an exemplary embodiment of the present general inventive concept, respectively, in a second operation mode.
Figure 5B:
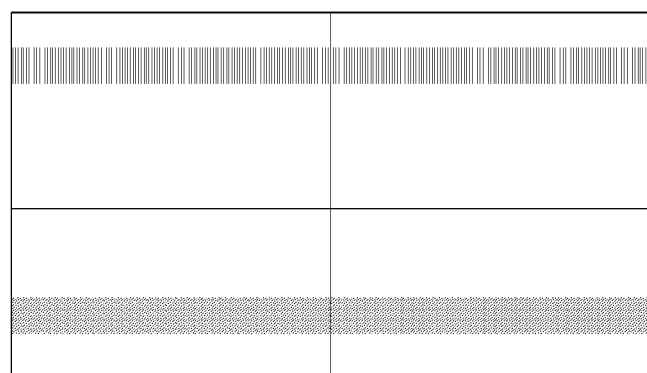

FIGS. 5A and 5B are views illustrating a waveform of an output voltage of a related-art electronic apparatus and a waveform of an output voltage of the electronic apparatus according to an exemplary embodiment, respectively, in the second operation mode. FIG. 5A illustrates a waveform of an output voltage of a related-art electronic apparatus, and FIG. 5B illustrates a waveform of an output voltage of the electronic apparatus according to an exemplary embodiment of the present general inventive concept. Referring to FIG. 5A, power of 80 W, which greatly exceeds rated power of an adaptor, is output from the related-art electronic apparatus.

Referring to FIG. 5B, even if power exceeding rated power of an adaptor is output, the output of the adaptor is limited to 60 W due to an operation of the comparison circuit unit 240.

Figure 6:
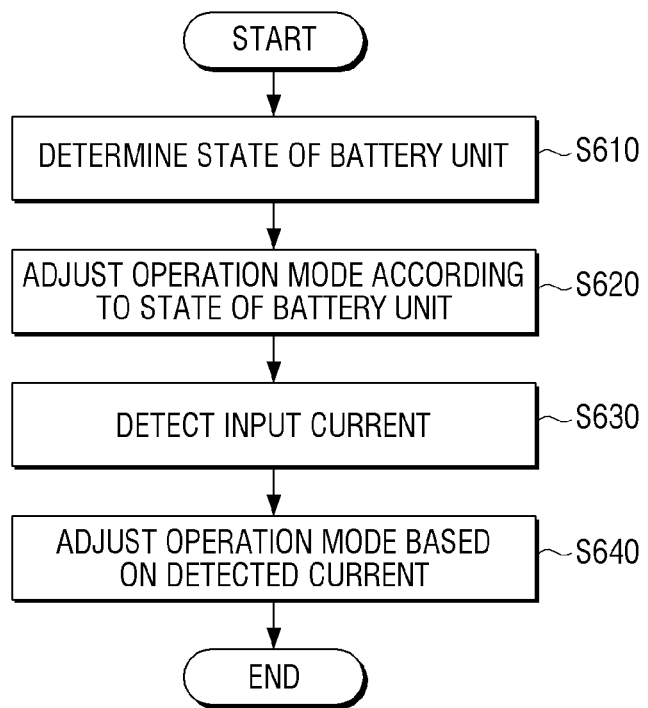
FIG. 6 is a flowchart to explain a power supply method according to an exemplary embodiment of the present general inventive concept.

FIG. 6 is a flowchart illustrating a power supply method according to an exemplary embodiment of the present general inventive concept.

Referring to FIG. 6, an electronic apparatus is operated in a first operation mode in which the electronic apparatus is operated according to a predetermined first thermal design power. Here, the electronic apparatus may be the electronic apparatus 100 of FIG. 1.

The electronic apparatus 100 determines a state of a battery unit in the first operation mode at operation S610. It is determined whether the battery unit is mounted in the electronic apparatus 100, and, when the battery unit is mounted in the electronic apparatus 100, it is determined whether a charge capacity of the battery unit is greater than or equal to a predetermined capacity.

An operation mode is adjusted according to the state of the battery unit at operation S620. Even if an operation load of the electronic apparatus 100 is high and thus a mode needs to be changed to a second operation mode, the electronic apparatus 100 changes the mode to the second operation mode only if the battery unit is mounted in the electronic apparatus 100 and the charge capacity of the battery unit is greater than the predetermined capacity.

A current of power input through the input unit 210 is detected at operation S630.

The operation mode is adjusted based on the detected current at operation S640. When the detected current is greater than or equal to a predetermined current, the control unit changes a mode to a third operation mode in which the electronic apparatus 100 consumes power lower than that of the first operation mode.

Figure 7:
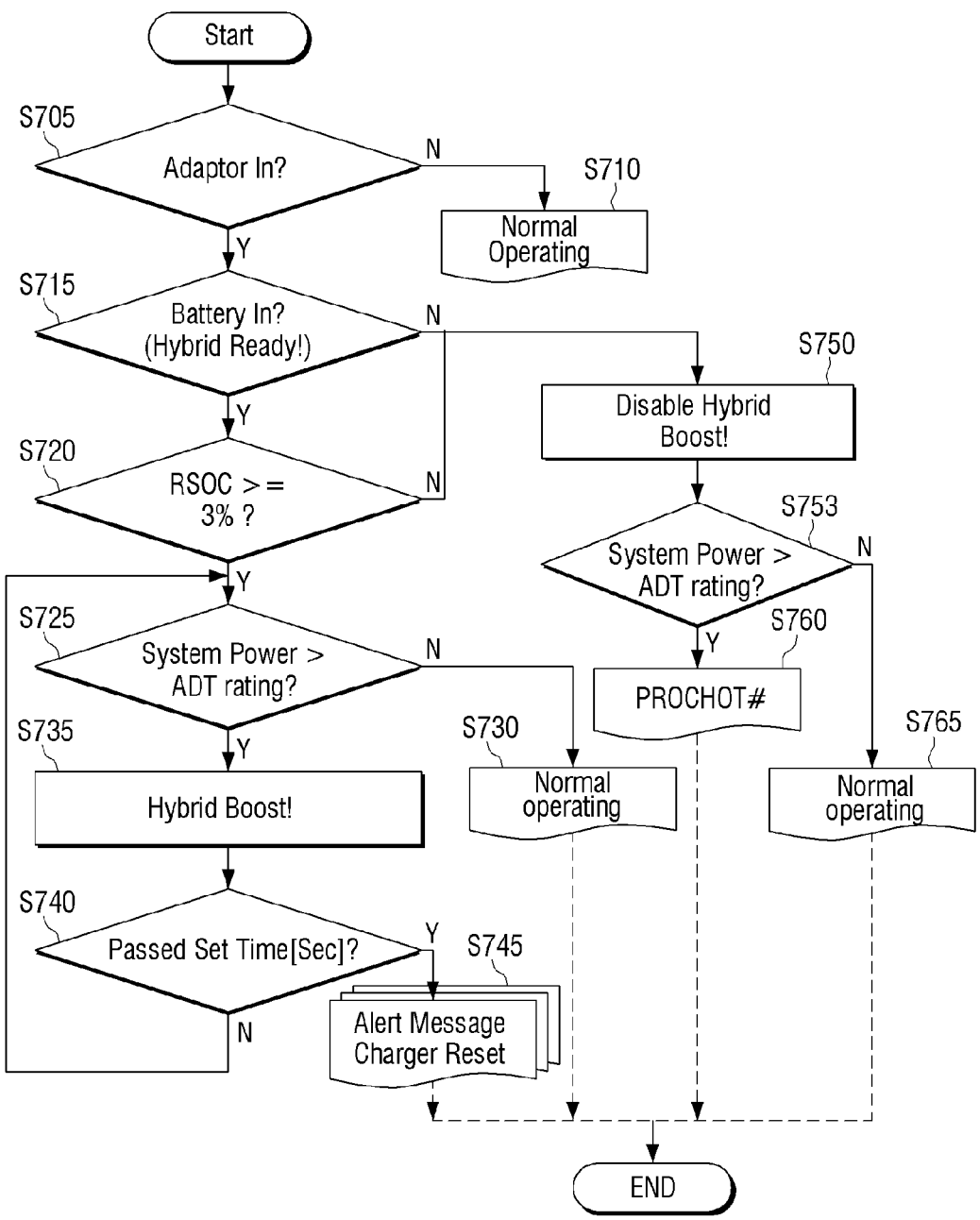
FIG. 7 is a flowchart illustrating the power supply method of FIG. 6 in detail.
Figure 8:
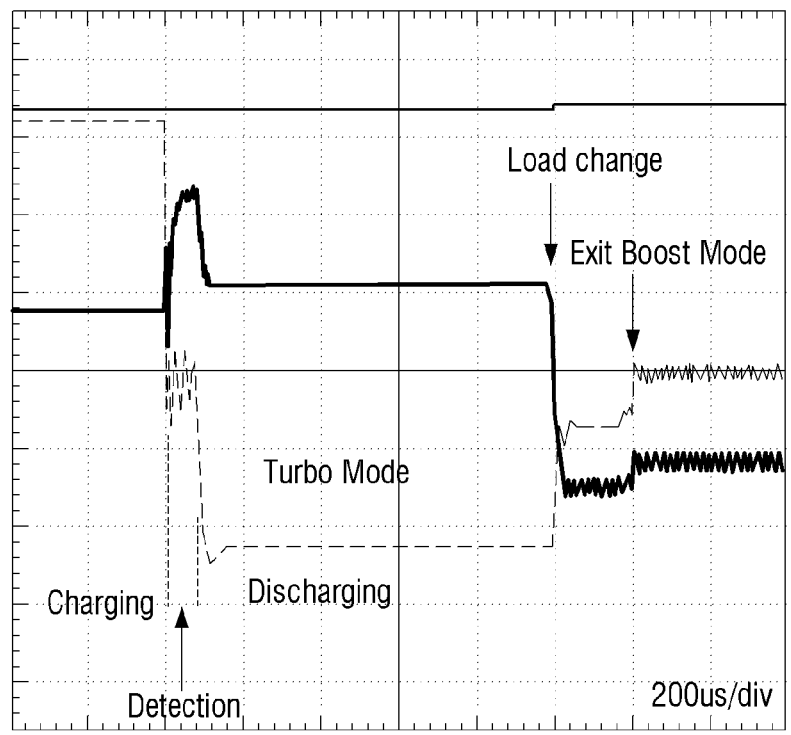
FIG. 8 is a view illustrating a waveform to explain a problem of a conventional hybrid power system.

FIG. 7 is a flowchart illustrating the power supply method of FIG. 6 in detail.

Referring to FIGS. 6 and 7, it is determined whether an adaptor is connected or not at operation S705.

When the adaptor is not connected at operation S705-N, the electronic apparatus 100 is operated in a normal mode (that is, the first operation mode). At this time, the electronic apparatus 100 is driven using a power source of the battery unit 220.

On the other hand, when the adaptor is connected at operation 5705-Y, it is determined whether a battery is mounted or not at operation S715. When the battery is mounted at operation S715-Y, it is determined whether a charge capacity of the battery is greater than or equal to a predetermined capacity at operation S720.

When the battery is not mounted or if the charge capacity of the battery is less than the predetermined capacity at operation S715-N or S720-N, power is not supplied by a hybrid power system at operation S750.

When a battery charged with a capacity greater than or equal to the predetermined capacity is mounted, it is determined whether power of the system is less than power of the adaptor at operation S725. When the power of the system is less than the power of the adaptor at operation S725-Y, power is supplied by the hybrid power system. That is, the electronic apparatus 100 is operated in the second operation mode.

When the mode is changed to the second operation mode, it is determined whether the second operation mode is maintained for a predetermined time or more at operation S740. When the second operation mode is maintained for a predetermined time or more, an alert message to change the second operation mode to the first operation mode may be displayed at operation S745.

On the other hand, when the power is not set to be supplied by the hybrid power system, it is determined whether the power of the system is less than the power of the adaptor at operation S753. when the power of the system is less than the rated power of the adaptor, the electronic apparatus 100 is operated in the normal mode at operation S765.

On the other hand, when the power of the system is greater than or equal to the rated power of the adaptor, the PROCHOT# is operated so that the mode is changed to the third operation mode at operation S760.

Accordingly, the driving control method according to the exemplary embodiment can stably supply power to the electronic apparatus 100 and can deal with the load of the system which is suddenly changed using a relatively simple circuit. The driving control method of FIGS. 6 and 7 may be executed on the electronic apparatus having the configuration of FIG. 1 and may be executed on an electronic apparatus having other configurations.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus having a plurality of operation modes, the electronic apparatus comprising:
an input circuit configured to receive an input of DC power from an external adaptor;
a battery configured to store the received DC power, the battery removable from the electronic apparatus;
a first controller configured to use selectively provided power to operate the electronic apparatus in a first operation mode using power of only the battery or power of only the input circuit, and to use the selectively provided power to operate the electronic apparatus in a second operation mode using both the power of the battery and the power input from the input circuit simultaneously;
a power controller configured to selectively provide the power input through the input circuit and the battery to the first controller and to prevent an operating mode of the electronic apparatus from being changed from the first operation mode to the second operation mode according to a detected charge state of the mounted battery being less than or equal to a predetermined capacity and according to a supply of the DC power received by the input circuit, and upon detecting the battery is not mounted in the electronic apparatus; and
a display to display an alert message when a mode of the electronic apparatus is changed to the second operation mode and the second operation mode is maintained longer than a predetermined time,
wherein the first controller using the selectively provided power comprises at least one of a central processing unit (CPU), a graphic processor, and a CPU having a graphic processor embedded therein.

2. The electronic apparatus as claimed in claim 1, wherein:
the power controller controls to provide the power input through the input circuit to the first controller selectively according to an operation mode of the electronic apparatus; and
the power controller controls the battery to be charged with the power input through the input circuit according to an operation mode of the electronic apparatus and a charge state of the battery.

3. The electronic apparatus as claimed in claim 1, further comprising:
a comparison circuit to detect a current of the power input through the input circuit; and
wherein, when the detected current is greater than or equal to a predetermined current, the comparison circuit controls the first controller to be operated in a third operation mode in which power lower than power of the first operation mode is consumed.

4. The electronic apparatus as claimed in claim 3, wherein the comparison circuit comprises:
a first voltage generator to generate a voltage value corresponding to a current value of the power input through the input circuit,
a second voltage generator to generate a predetermined reference voltage value corresponding to the predetermined current, and
a circuit to compare an output voltage of the first voltage generator and an output voltage of the second voltage generator, and to provide a result of the comparing to the first controller.

5. The electronic apparatus as claimed in claim 4, wherein the power controller obtains information on a rated power of the adaptor and controls the second voltage generator to generate a predetermined reference voltage value corresponding to the obtained information.

6. The electronic apparatus as claimed in claim 1, further comprising:
a user interface to display information indicating that the electronic apparatus is operated in a third operation mode, when a mode of the electronic apparatus is changed to the third operation mode.

7. The electronic apparatus as claimed in claim 1, further comprising:
a second controller to provide information on a state of the battery and a state of the input circuit to the first controller.

8. The electronic apparatus as claimed in claim 7, wherein the second controller is a main board chipset.

9. The electronic apparatus as claimed in claim 1, wherein:
the first operation mode is a mode in which the first controller is operated by a predetermined first thermal design power; and
the second operation mode is a mode in which the first controller is operated by a second thermal design power that is higher than the first thermal design power, using both power of the battery and power input from the input circuit.

10. A driving control method of an electronic apparatus which has a plurality of operation modes, the method comprising:
selectively providing power to a controller to operate the electronic apparatus in a first operation mode according to a predetermined first thermal design power; and
changing an operation mode of the electronic apparatus to a second operation mode, in which the controller selectively provides power to the controller to operate the electronic apparatus according to a second thermal design power higher than the first thermal design power, using both a DC power provided from an external adaptor and a power of a battery simultaneously according to an operation load of the electronic apparatus, the battery removable from the electronic apparatus; and
displaying an alert message when a mode of the electronic apparatus is changed to the second operation mode and the second operation mode is maintained longer than a predetermined time,
wherein the changing comprises preventing the operation mode of the electronic apparatus from being changed from the first operation mode to the second operation mode according to a detected charge state of the mounted battery being less than or equal to a predetermined capacity and according to a supply of the DC power provided from the external adaptor, and upon detecting the battery is not mounted in the electronic apparatus, and
wherein the controller using the selectively provided power comprises at least one of a central processing unit (CPU), a graphic processor, and a CPU having a graphic processor embedded therein.

11. The method as claimed in claim 10, further comprising:
detecting a current of power input through an input circuit; and
when the detected current is greater than or equal to a predetermined current, changing a mode to a third operation mode in which the controller consumes power lower than power of the first operation mode.

12. The method as claimed in claim 11, further comprising:
obtaining information of rated power of the adaptor, wherein the predetermined current is a current value corresponding to the obtained information.

13. The method as claimed in claim 11, further comprising;
when a mode of the electronic apparatus is changed to the third operation mode, displaying information indicating that the electronic apparatus is operated in the third operation mode.

14. A non-transitory computer-readable medium including computer-readable codes as program to execute a driving control method in an electronic apparatus which has a plurality of operation modes, the driving control method of an electronic apparatus which has a plurality of operation modes comprising:
selectively providing power to a controller to operate the electronic apparatus in a first operation mode according to a predetermined first thermal design power;
changing an operation mode of the electronic apparatus to a second operation mode, in which the controller selectively provides power to the controller to operate the electronic apparatus according to a second thermal design power higher than the first thermal design power, using both a DC power provided from an external adaptor and a power of a battery simultaneously according to an operation load of the electronic apparatus, the battery removable from the electronic apparatus;
displaying an alert message when a mode of the electronic apparatus is changed to the second operation mode and the second operation mode is maintained longer than a predetermined time,
wherein the changing comprises preventing the operation mode of the electronic apparatus from being changed from the first operation mode to the second operation mode according to a detected charge state of the mounted battery being less than or equal to a predetermined capacity and according to a supply of the DC power provided from the external adaptor, and upon detecting the battery is not mounted in the electronic apparatus and according to a supply of the DC power provided from the external adaptor, and
wherein the controller using the selectively provided power comprises at least one of a central processing unit (CPU), a graphic processor, and a CPU having a graphic processor embedded therein.

* * * * *